US011527897B1

United States Patent
Brumley, Jr. et al.

(10) Patent No.: US 11,527,897 B1
(45) Date of Patent: Dec. 13, 2022

(54) BATTERY CHARGER AND ENGINE JUMP START SYSTEM WITH AUTOMATIC OPERATING MODE VIA A SINGLE OUTPUT RECEPTACLE

(71) Applicant: Deltran Operations USA, Inc., DeLand, FL (US)

(72) Inventors: Edward William Brumley, Jr., Port Orange, FL (US); Peter James Shread, Celebration, FL (US); Francisco Javier De La Cruz, Apopka, FL (US)

(73) Assignee: DELTRAN OPERATIONS USA, INC., Deland, FL (US)

( * ) Notice: Subject to any disclaimer, the term of this patent is extended or adjusted under 35 U.S.C. 154(b) by 0 days.

(21) Appl. No.: 17/327,112

(22) Filed: May 21, 2021

(51) Int. Cl.
| | |
|---|---|
| H02J 7/00 | (2006.01) |
| F02N 15/00 | (2006.01) |
| F02N 11/12 | (2006.01) |
| H02J 7/34 | (2006.01) |
| H02J 1/10 | (2006.01) |

(52) U.S. Cl.
CPC ............ *H02J 7/0042* (2013.01); *F02N 11/12* (2013.01); *F02N 15/00* (2013.01); *H02J 1/122* (2020.01); *H02J 7/007* (2013.01); *H02J 7/342* (2020.01)

(58) Field of Classification Search
CPC .. H02J 7/342; H02J 7/0047; H02J 7/00; H02J 7/007; H02J 1/122; H02J 2310/46; F02N 11/12; F02N 11/14; F02N 15/00
See application file for complete search history.

(56) References Cited

U.S. PATENT DOCUMENTS

| | | |
|---|---|---|
| 5,083,076 A | 1/1992 | Scott |
| 6,281,600 B1 | 8/2001 | Hough et al. |
| 6,344,733 B1 | 2/2002 | Crass et al. |
| 6,788,025 B2 | 9/2004 | Bertness et al. |
| 6,822,425 B2 | 11/2004 | Krieger et al. |
| 8,575,899 B2 | 11/2013 | Whiting et al. |
| 8,969,762 B2 | 3/2015 | Beeson et al. |

(Continued)

OTHER PUBLICATIONS

"Smartech Products Power Kit" www.smartechpowerkit.com (Accessed Mar. 10, 2021) https://www.smartechpowerkit.com/?mid=10431187 &gclid=EAIaIQobChMIsrGIy6-m7wIVlNrICh3YVwzXEAQYAiABEgJXyPD_BwE.

(Continued)

*Primary Examiner* — Ryan Johnson
(74) *Attorney, Agent, or Firm* — Greenberg Traurig LLP; Michael K. Dixon

(57) ABSTRACT

A combined battery charger and engine jump start system configured to automatically determine in which operating mode to operate based on the output plug attached to an output outlet is disclosed. For instance, the system may include a single output outlet and a single cable capable of being attached to the single output outlet in multiple positions to enable the system to automatically operate in the correct mode. In another embodiment, the system may include a single output outlet and a cable for a battery charger process and a cable for an engine jump start process whereby a cable position or plug configuration enables the system to automatically operate in the correct mode. As such, the system is more cost effective to manufacture and more reliable in that the system is automatically places itself in the correct operating mode when a cable is attached thereto.

21 Claims, 15 Drawing Sheets

(56) References Cited

U.S. PATENT DOCUMENTS

| | | |
|---|---|---|
| 9,007,015 B1 | 4/2015 | Nook et al. |
| 9,397,513 B2 | 7/2016 | Butler et al. |
| 9,579,990 B2 | 2/2017 | Butler et al. |
| 9,912,183 B2 | 3/2018 | Kokot et al. |
| 10,075,000 B2 | 9/2018 | Miller et al. |
| 10,141,755 B2 | 11/2018 | Miller et al. |
| 10,243,382 B2 | 3/2019 | Liao et al. |
| 10,250,056 B2 | 4/2019 | Miller et al. |
| 10,328,808 B2 | 6/2019 | Nook et al. |
| 10,576,573 B2 | 3/2020 | Fosbinder |
| 10,693,303 B2 | 6/2020 | Miller et al. |
| 10,819,132 B2 | 10/2020 | Gordon et al. |
| 2004/0239290 A1 | 12/2004 | Krieger |
| 2014/0159509 A1 | 6/2014 | Inskeep |
| 2014/0300311 A1 | 10/2014 | Caren et al. |
| 2016/0308382 A1* | 10/2016 | Pan .......................... H02J 1/00 |
| 2017/0012448 A1* | 1/2017 | Miller ................... H02J 7/0021 |
| 2020/0072177 A1 | 3/2020 | Clarke et al. |
| 2020/0136414 A1 | 4/2020 | Patsos et al. |
| 2020/0295575 A1 | 9/2020 | Nook et al. |
| 2020/0376982 A1 | 12/2020 | Heatley et al. |

OTHER PUBLICATIONS

"Bolt Portable Dual USB Car Jump Starter" zagg.com (Aug. 2, 2020) https://web.archive.org/web/20200803182822/https://www.zagg.com/en_us/bolt-portable-dual-usb-car-jump-starte r.

"QuickCable Rescue LiFePO4 Jump Starter Portable Power Pack—200 Amp Cranking/400 Amp Peak" batterymart.com (Accessed Mar. 10, 2021) https://www.batterymart.com/p-604300-quickcable-portable-power-pack.html?gclid=EAIaIQobChMIrNisk7Cm7wIVg-DICh0VlwylEAQYByABEgJrOvD_BwE.

ISA/US, International Report and Written Opinion, PCT/US2022/030287, dated May 20, 2022, Commissioner for Patents, Arlington USA.

* cited by examiner

BATTERY CHARGER AND ENGINE JUMP START SYSTEM WITH AUTOMATIC OPERATING MODE VIA A SINGLE OUTPUT RECEPTACLE

FIELD OF THE INVENTION

The invention relates to battery chargers, and more particularly, to combined battery chargers and engine jump start systems.

BACKGROUND

Currently, there exist dual mode battery chargers configured to charge batteries and provide boost power for engine jump start applications. These dual mode systems typically include a battery charge cable for battery charge applications and an engine jump start cable for engine jump start applications. These two cables may be permanently attached to a control housing or removably attached to two different outlets in the control housing, an outlet for the battery charge cable that is different than an outlet for the engine jump start cable. The operating mode of a dual mode battery charger may be established via a mode switch or other manual process.

SUMMARY OF THE INVENTION

A combined battery charger and engine jump start system configured to automatically determine in which operating mode to operate based on the output plug attached to an output outlet is disclosed. For instance, the system may include a single output outlet and a single cable capable of being attached to the single output outlet in multiple positions to enable the system to automatically operate in the correct mode. In another embodiment, the system may include a single output outlet and a cable for a battery charger process and a cable for an engine jump start process whereby a cable position or plug configuration enables the system to automatically operate in the correct mode. As such, the system is more cost effective to manufacture and more reliable in that the system is automatically places itself in the correct operating mode when a cable is attached thereto.

In at least one embodiment, the combined battery charger and engine jump start system may include a battery charger subsystem configured to charge a battery and an engine jump start subsystem configured to output sufficient power to jump start an engine. The system may include an output outlet configured to releasably receive one or more output plugs coupled to a cable. The system may automatically determine in which operating mode to operate based on the output plug attached to the output outlet.

In at least one embodiment, the output outlet may be configured to receive the output plug in a first position within the output outlet such that the output plug is in communication with the battery charger subsystem, and the system may be configured to receive the output plug in a second position within the output outlet such that the output plug is in communication with the engine jump start subsystem. The output plug may be coupled to a cable having positive and negative transmission lines that is usable for both operation of the battery charger subsystem and operation of the engine jump start subsystem. A single multipurpose cable may be configured to be usable for engine jump start processes and for battery charger processes, whereby the single multipurpose cable includes an output plug configured to be removably attached to the output outlet.

In at least one embodiment, the output outlet may be keyed to prevent a plug from being connected in a misaligned orientation. The output outlet may include a common negative electrical connector and two positive electrical connectors separated by the common return electrical connector. The common negative electrical connector may have a different cross-sectional shape than a shape of the two positive electrical connectors. In one configuration, each of the two positive electrical connectors may have a same cross-sectional shape. Alternatively, the output outlet may include a common positive electrical connector and two negative electrical connectors separated by the common positive electrical connector. The common positive electrical connector may have a different cross-sectional shape than a shape of the two negative electrical connectors. In one configuration, each of the two negative electrical connectors has a same cross-sectional shape.

In another embodiment, the output plug may be first and second plugs, whereby the first plug is coupled to a charger cable and the first plug may be configured to be attached to the output outlet in the first position and not the second position. The second plug may be coupled to an engine jump start cable and the second plug may be configured to be attached to the output outlet in the second position and not the first position. The engine jump start cable may be configured to be usable for an engine jump start process. The battery charger cable may be configured to be usable for a battery charging process with a second output plug.

The output outlet may include a common negative electrical connector and two positive electrical connectors separated by the common return electrical connector, or vice versa. In at least one embodiment, each of the common negative electrical connector and two positive electrical connectors may have a different cross-sectional shape.

The output outlet may include a first connector having a first electrical polarity and a second connector having a second electrical polarity opposite to the first polarity. The second connector may be formed from a second set of connectors having a second electrical polarity opposite to the first polarity. In at least one embodiment, the output outlet or output plug, or both, may include at least one function indicator for identifying a type of cable.

In another embodiment, the system may include a positive electrical connector and a negative electrical connector, wherein the output outlet is keyed to prevent a plug from being connected in a misaligned orientation. The positive electrical connector may have a cross-sectional shape that is different than a cross-sectional shape for the negative electrical connector.

An advantage of the system is that the system may automatically place itself in a correct operating mode based on an output plug position, presence or lack of an indicator, or which connectors or pins to which an output plug are attached within a single output outlet.

Another advantage of the system is that a single output outlet may be used to provide power to both a battery charger cable and to an engine jump start cable.

Yet another advantage of the system is that a single output outlet may be used with a single cable for both a battery charge process and an engine jump start process.

These and other embodiments are described in more detail below.

DETAILED DESCRIPTION OF THE FIGURES

Figure 1:
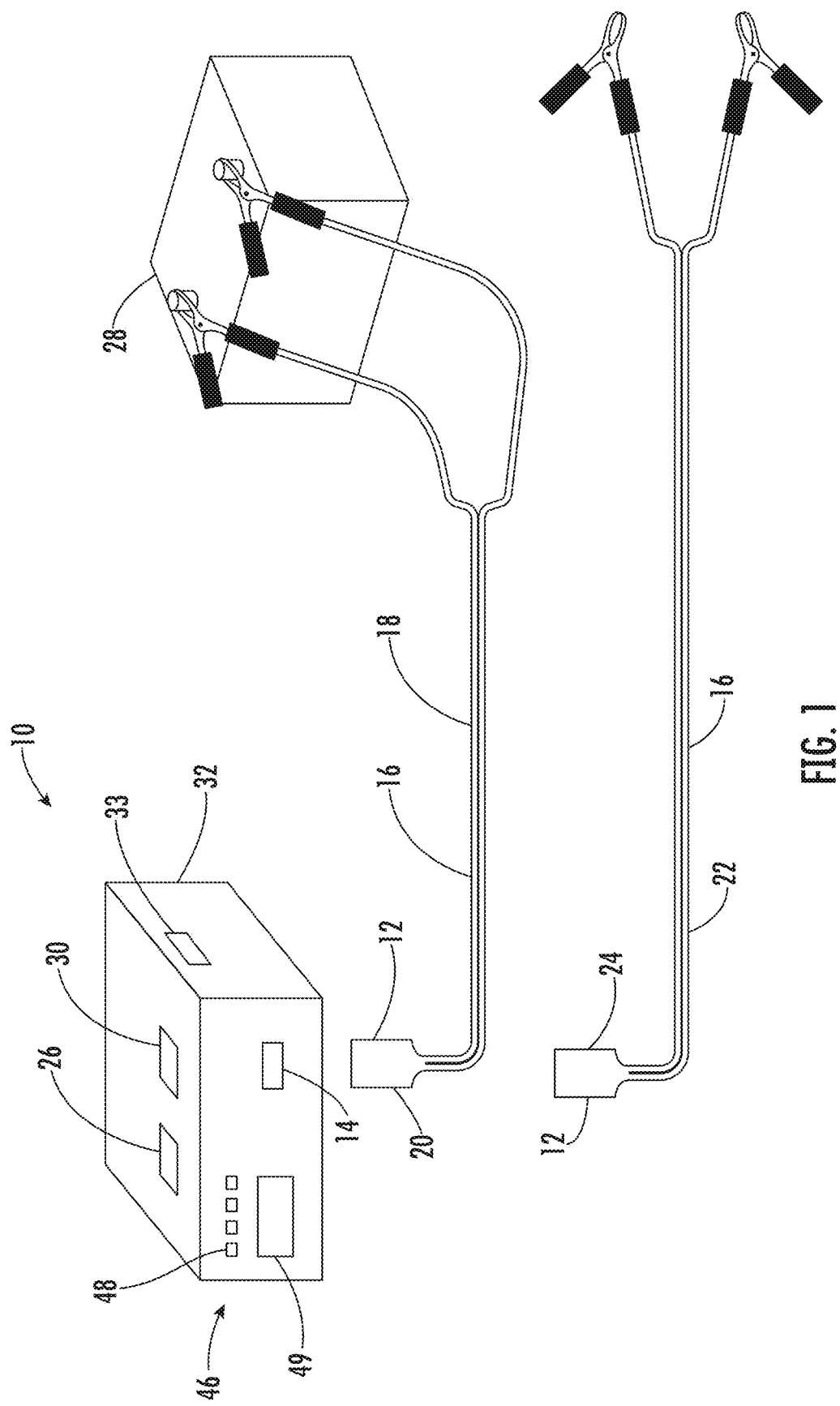
FIG. 1 is a perspective view of the combined battery charger and engine jump start system.

As shown in FIGS. 1-18, a combined battery charger and engine jump start system 10 configured to automatically determine in which operating mode to operate based on an output plug 12 attached to an output outlet 14 is disclosed. For instance, the system 10 may include a single output outlet 14 and a single cable 16 capable of being attached to the single output outlet 14 in multiple positions to enable the system 10 to automatically operate in the correct mode. In another embodiment, the system 10 may include a single output outlet 14 and a first cable 18 with a first output plug 20 for a battery charger process and a second cable 22 with a second output plug 24 for an engine jump start process whereby a cable position or plug configuration enables the system 10 to automatically operate in the correct mode. As such, the system 10 is more cost effective to manufacture and more reliable in that the system 10 automatically places itself in the correct operating mode when a cable 16 is attached thereto.

In at least one embodiment, the combined battery charger and engine jump start system may include a battery charger subsystem 26 configured to charge a battery 28. The battery charger subsystem 26 may be, but is not limited to being, a system configured to charge a battery 28. The battery charger subsystem 26 is not limited to a particular type of battery chemistry and may be configured to charge any battery 28 already known or yet to be conceived. Similarly, the battery charger subsystem 26 is not limited to a particular voltage or voltage range. In at least one embodiment, the battery charger subsystem 26 may be configured to charge a 12 volt battery 28.

The system 10 may also include an engine jump start subsystem 30 configured to output sufficient power to jump start an engine. The engine is not limited to any particular engine currently know or yet to be conceived. The engine may be any engine started with the use of a battery providing power. The engine may be, but is not limited to being, positioned in a vehicle, motorcycle, off-road vehicle, all-terrain vehicle, side-by-side vehicle, personal watercraft, and the like.

The system 10 may include an output outlet 14 configured to releasably receive one or more output plugs 12 coupled to a cable 16. The output outlet 14 may have numerous configurations, as described in more detail below. The output outlet 14 may be a receptacle configured to securely and removably receive an output plug 12 attached to a cable 16. The output outlet 14 may include one or more pins or other connectors extending outwardly therefrom to be received within the receivers in the output plug 12, or vice versa. The pins, connectors and receivers may have any appropriate configuration usable to enable releasable connection between the cable 16 and the output outlet 14.

As shown in FIG. 1, the output outlet 14 may be positioned in a housing 32 that may contain, but is not required to contain, the battery charger subsystem 26, the engine jump start subsystem 30, and one or more controllers 33, such as, but not limited to a printed circuit board. The system 10 may include an interface controller 34, a battery charger subsystem controller 26 and an engine jump start subsystem controller 30. One or more of the interface controller 34, the battery charger subsystem controller 26 and the engine jump start subsystem controller 30 may be a printed circuit board with necessary components to control operation of their respective subsystems. The system 10 may include an internal battery 44, such as, but not limited to, a lithium battery, a lead acid battery, an AGM battery and gel battery.

Figure 3:
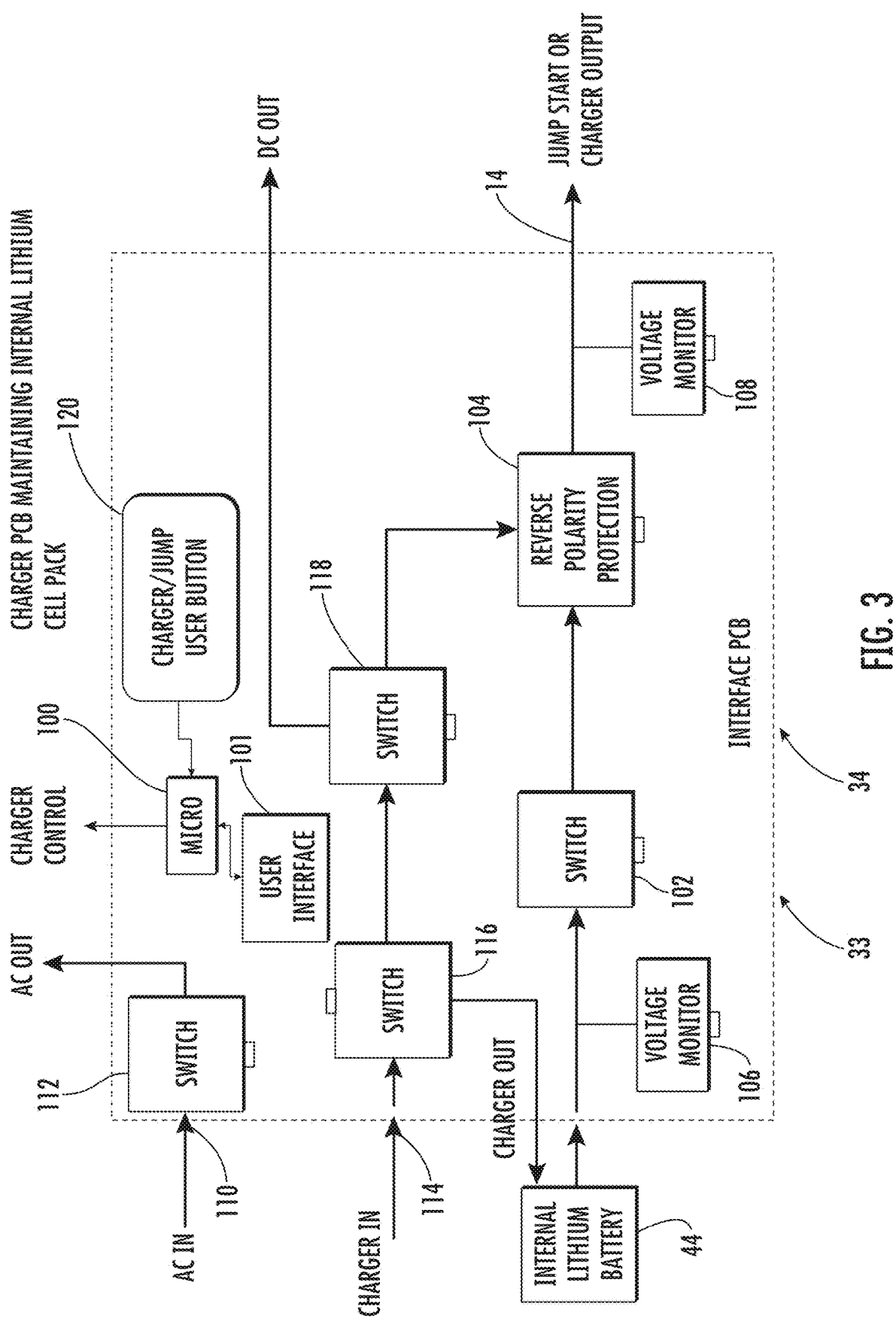
FIG. 3 is a schematic diagram of the interface controller for the output outlet.
Figure 18:
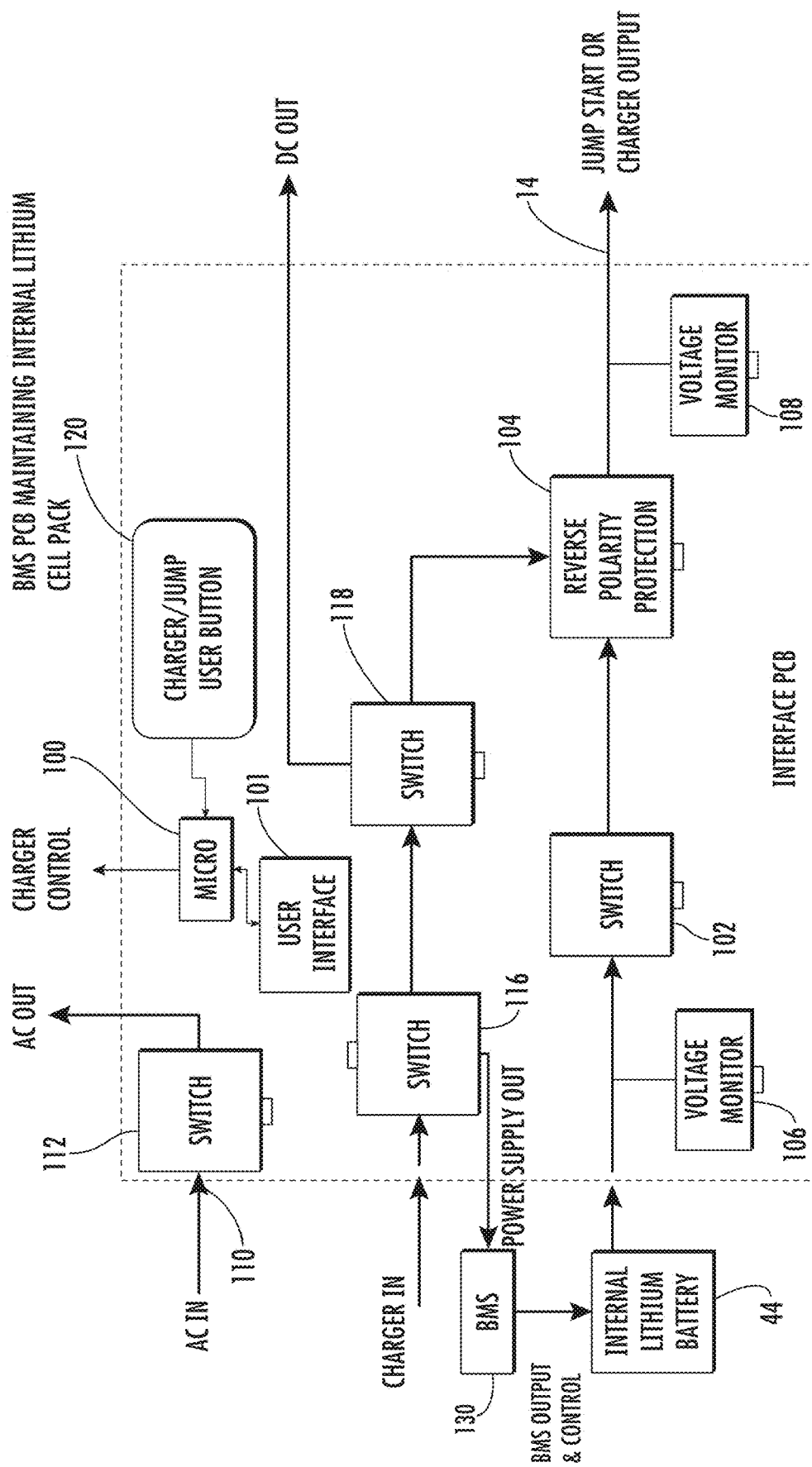

As shown in FIGS. 3 and 18, the interface controller 34 may include a microcontroller 100 in communication with a user interface 101. The interface controller 34 may receive energy from the battery 44 and pass that energy through a switch 102, reverse polarity protection 104 to an output outlet 14. A voltage monitor 106 may be in communication with the battery 44 upstream of the switch 102, and a voltage monitor 108 may be positioned between the reverse polarity protection 104 and the output outlet 14. The interface controller 34 may receive alternating current power (AC) at AC inlet 110 and pass the AC current through a switch 112 and on to the battery charger subsystem controller 26. The internal battery 44 may be charged via inlet port 114 through switch 116. The charger inlet port 114 may also provide power for an engine jump start process or battery charger process thru output outlet 14 through switch 118. As shown in FIG. 3, the interface controller 34 may allow the battery charger subsystem controller 26 to directly connect to the internal battery 44 to charge and maintain the charge of the internal battery 44.

Figure 2:
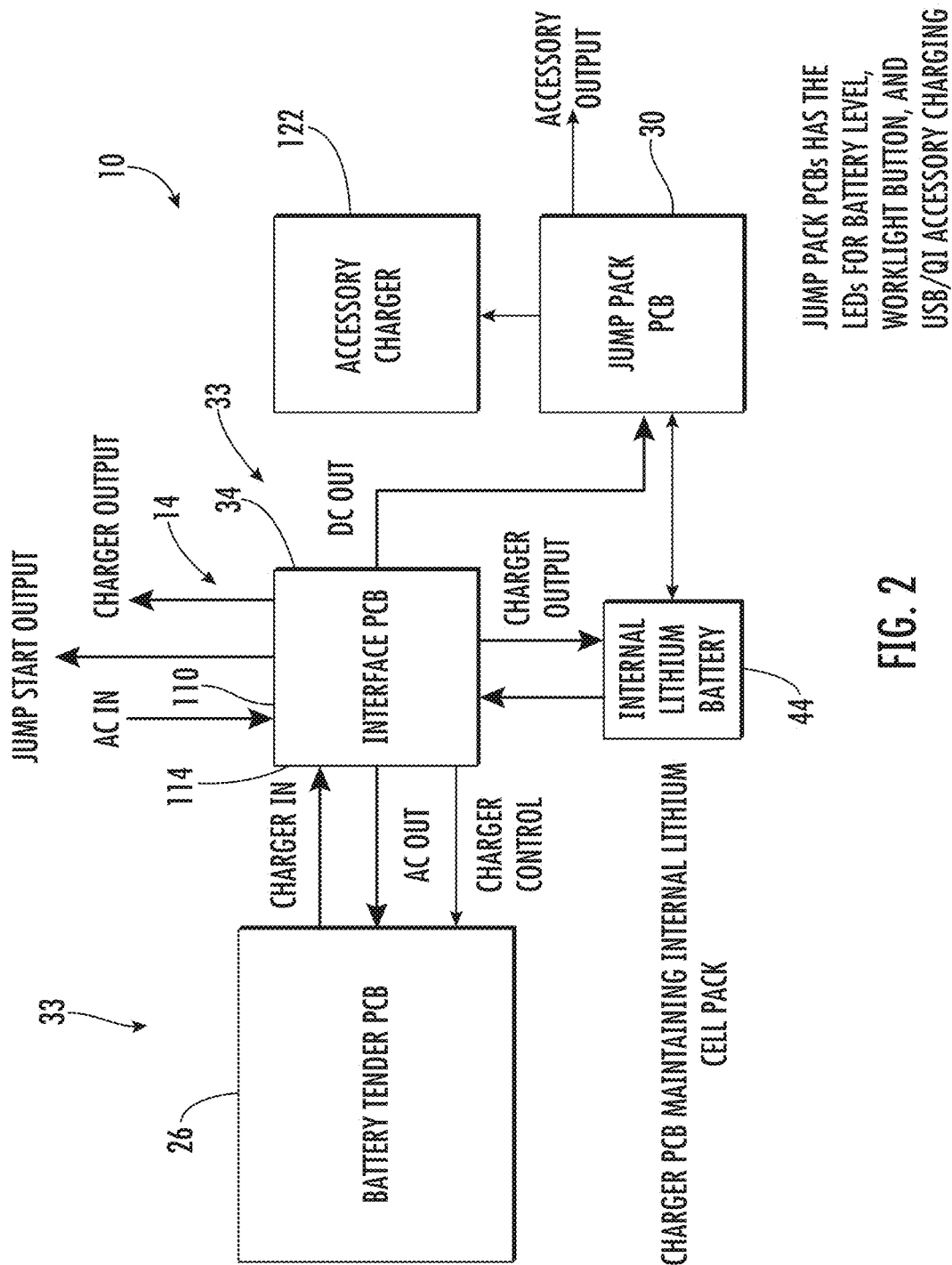
FIG. 2 is a schematic diagram of the combined battery charger and engine jump start system.

The system 10 may also include a manual switch 120 for choosing the operation mode between a battery charge process and an engine jump start process. As shown in FIG. 2, the system 10 may include an accessory charger 122 configured to charge external devices via a USB connection or other desired connection. The system 10 may include a notification system 46 for notifying a user as to the charge status of the battery 44, mode of operation, state of USB charging and other functions. The notification system 46 may display information via the user interface 101, which may include, but is not limited to including, one or more light emitting diodes (LEDs) 48, user interface screen 49 and the like.

Figure 10:
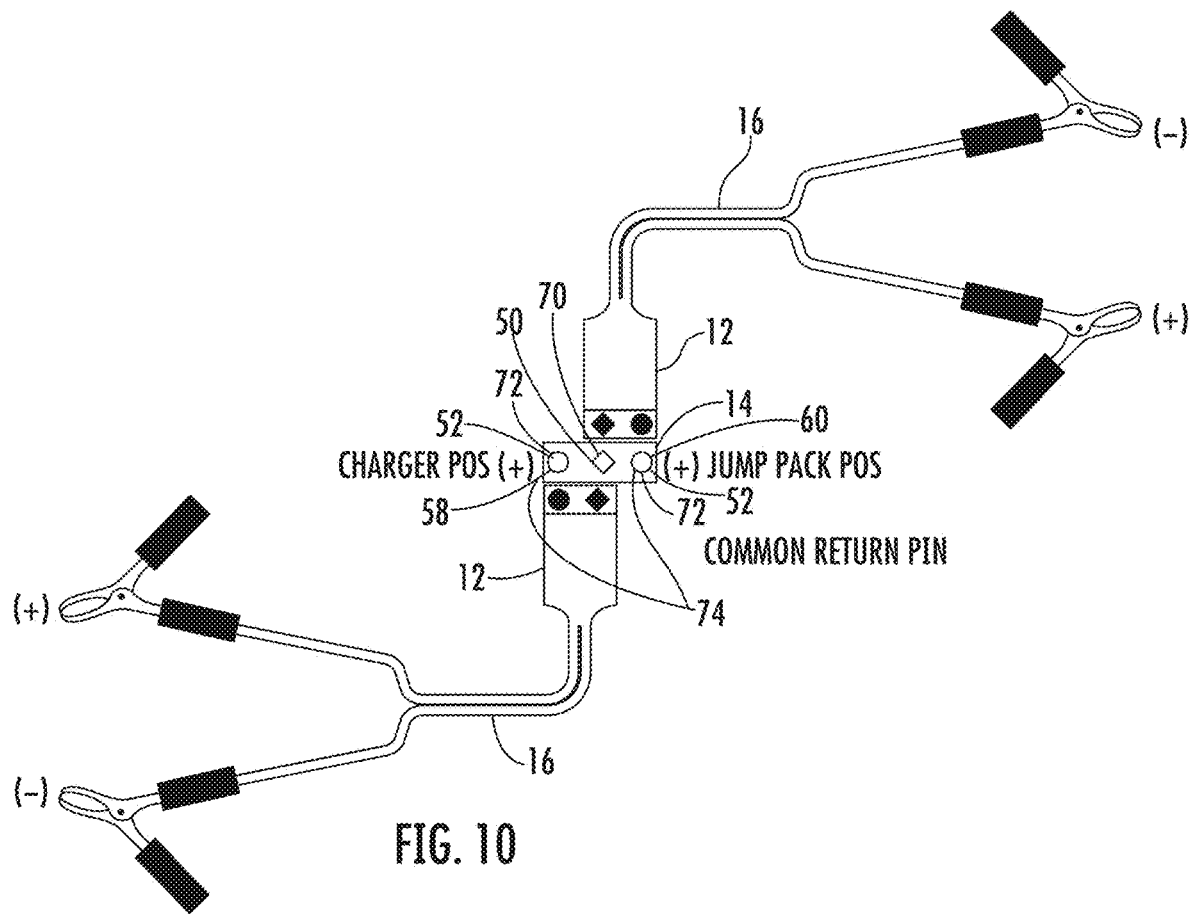
FIG. 10 is a diagram showing an output outlet and a cable positioned to be attached to the output outlet shown in FIG. 9.
Figure 11:
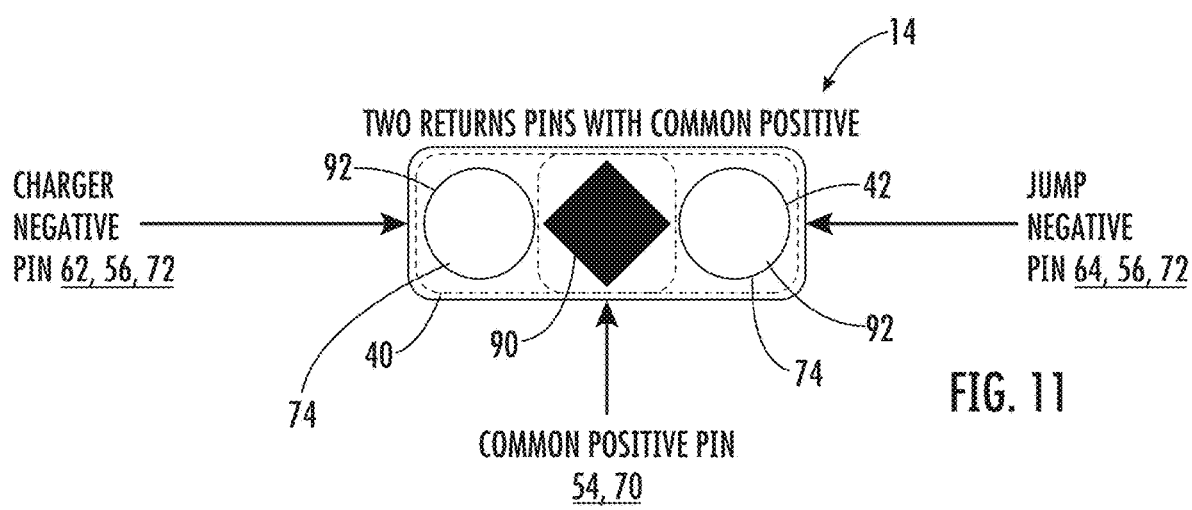
FIG. 11 is a front view of the output outlet for an embodiment with a single output outlet and a single combined battery charger cable and engine jump start cable, whereby the output outlet includes two negative connectors separated by a single positive connector.
Figure 17:
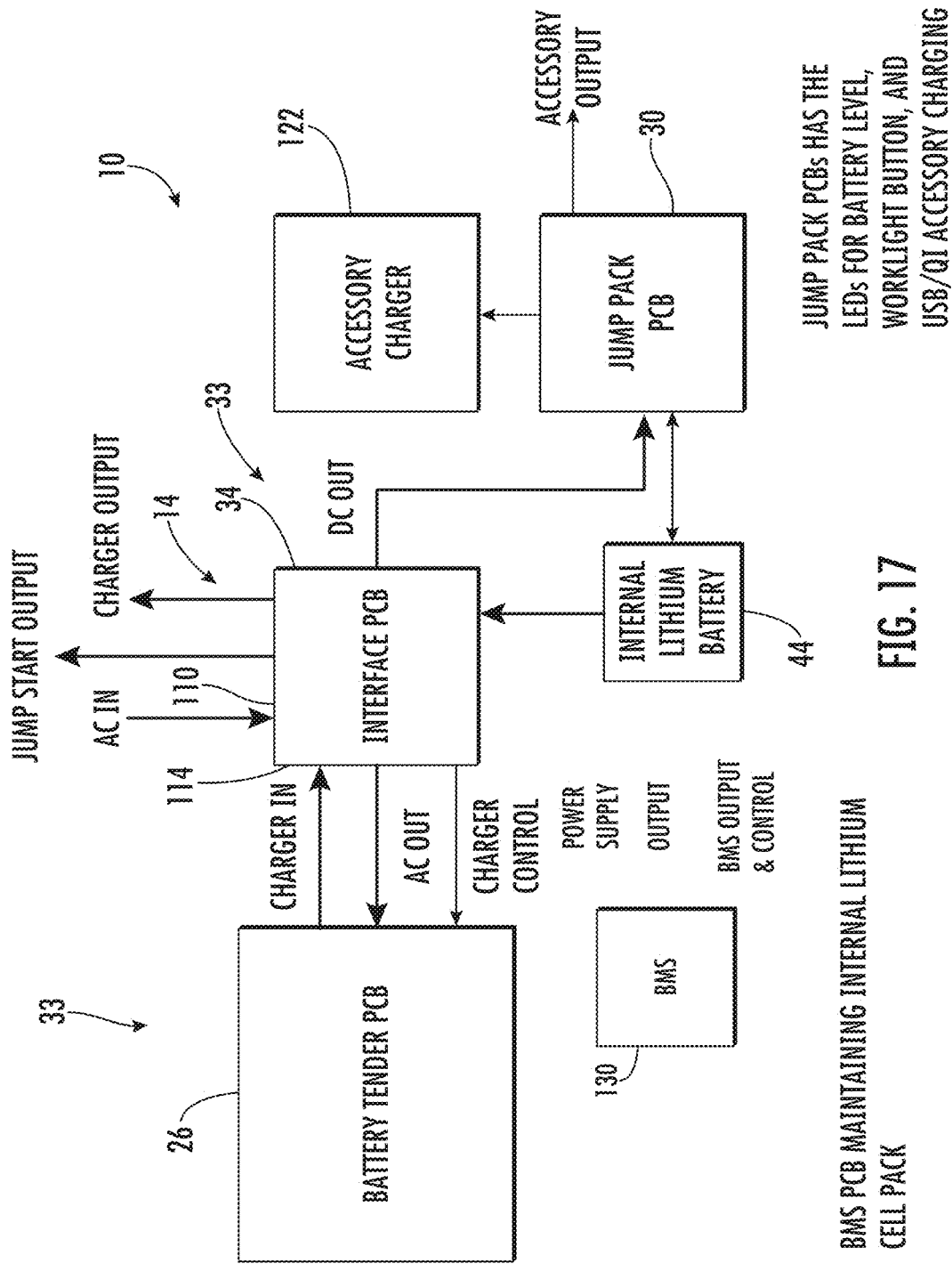
FIGS. 17 and 18 are the same schematic diagram of the combined battery charger and engine jump start system shown in FIGS. 2 and 3, respectively, together with a battery management system.

The embodiment of the system 10 in FIGS. 17 and 18 are very similar to the embodiment shown in FIGS. 2 and 3 with the addition of a battery management system 130 to the system 10 shown FIGS. 10 and 11. The battery management system 130 may be configured to control charging, over voltage protection mode, under voltage protection mode and cell balancing of the internal battery 44. The battery management system 130 may be configured to place the battery charger subsystem controller 26 into a power supply mode to supply power to the battery management system 130, which in turn controls the charge of the internal battery 44.

The system 10 may be configured to automatically determine in which operating mode to operate based on how the output plug 12 is attached to the output outlet 14. In at least one embodiment, the system 10 may be configured such that how an output plug 12 is attached to the output outlet 14 automatically places the system 10 in the correct operating mode.

In at least one embodiment, as shown in FIGS. 4-8, the system 10 is configured to include a single output outlet 14 and a first cable 18 with a first output plug 20 for a battery charger process and a second cable 22 with a second output plug 24 for an engine jump start process whereby a cable position or plug configuration enables the system 10 to automatically operate in the correct mode. The system 10 may include a battery charger cable 18 configured to be usable for a battery charging process with a second output plug 20, and the system 10 may include an engine jump start cable 22 configured to be usable for an engine jump start process with a first output plug 24. In the embodiment shown in FIGS. 9-16, the first output plug 20 may be configured to be attached to the output outlet 14 in a first position 40, and the second output plug 24 may be configured to be attached to the output outlet in a second position 42. The first and second positions 40, 42 may be different positions. In the embodiment shown in FIGS. 4-8, a function indicator 80 may be used to indicate which cable 16, between a battery charger cable 18 and an engine jump start cable 22, is attached to the output outlet 14.

As shown in FIGS. 4-16, the output outlet 14 may be configured to receive the output plug 12 in a first position 40 within the output outlet 14 such that the output plug 12 is in communication with the battery charger subsystem 26 and is configured to receive the output plug 12 in a second position 42 within the output outlet 14 such that the output plug 12 is in communication with the engine jump start subsystem 30. As shown in FIG. 1, the output plug 12 may be coupled to a cable 16 having positive and negative transmission lines that is usable for both operation of the battery charger subsystem 26 and operation of the engine jump start subsystem 30. The output outlet 14 may be keyed to prevent a output plug 12 from being connected in a misaligned orientation. The output outlet 14 may include a common negative electrical connector 50 and two positive electrical connectors 52 separated by the common negative electrical connector 50. In at least one embodiment, the common negative electrical connector 50 has a different cross-sectional shape than a shape of the two positive electrical connectors 52. Each of the two positive electrical connectors 52 has a same cross-sectional shape. One of the positive electrical connectors 52 may be in communication with the battery charger subsystem 26 and another positive electrical connector 52 may be in communication with the engine jump start subsystem 30. When a cable 16 and corresponding output plug 12 is attached to the common negative electrical connector 50 and the first positive electrical connection 58, the cable is in communication with the battery charger subsystem 26. When a cable 16 and corresponding output plug 12 is attached to the common negative electrical connector 50 and the second positive electrical connection 60, the cable is in communication with the engine jump start subsystem 30. The system 10 is configured to automatically determine in which position the output plug 12 is positioned and place the system 10 into the corresponding operating mode.

Figure 12:
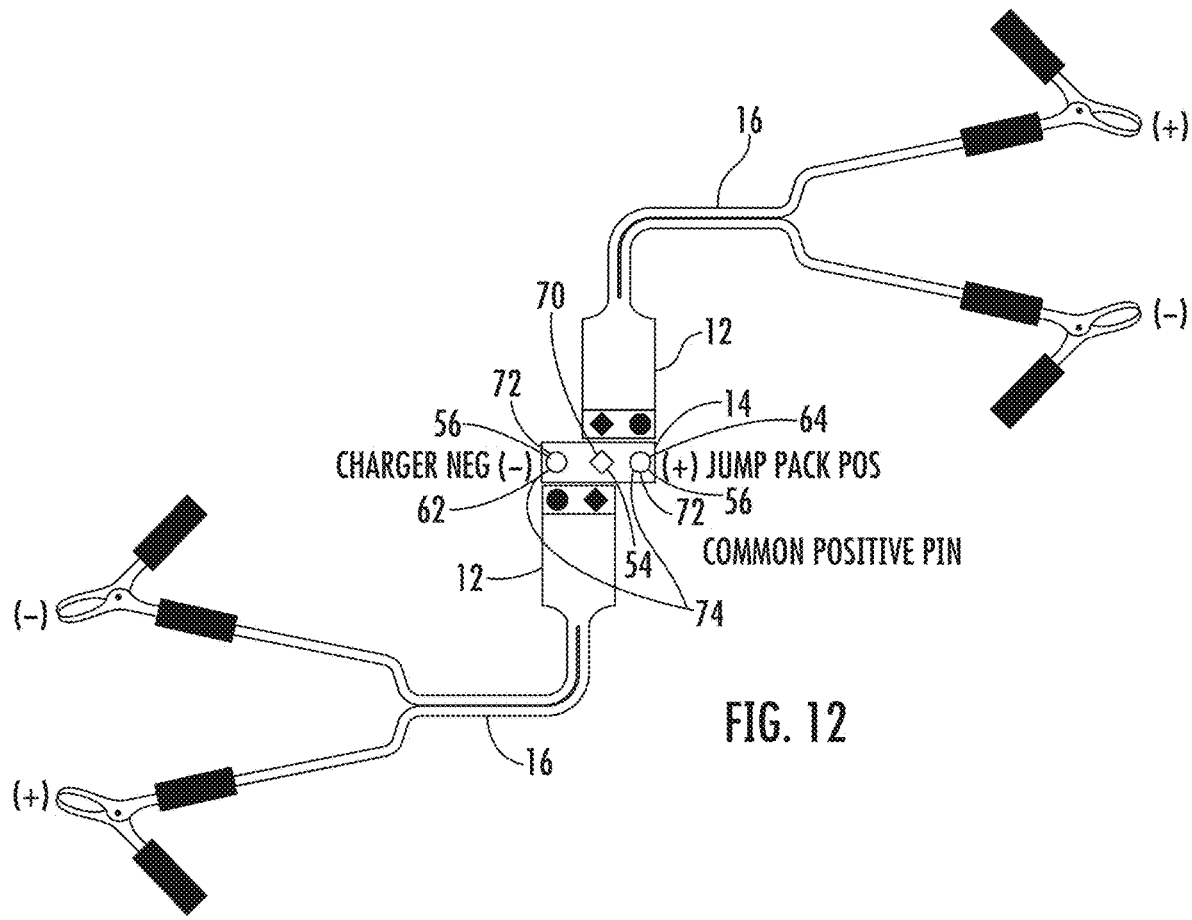
FIG. 12 is a diagram showing an output outlet and a cable positioned to be attached to the output outlet shown in FIG. 11.

As shown in FIGS. 1, 5, 7, 9, 10, 12, 14 and 16, the output plug 12 may be coupled to a cable 16 having positive and negative transmission lines that is usable for both operation of the battery charger subsystem 26 and operation of the engine jump start subsystem 30. The output outlet 14 may be keyed to prevent a output plug 12 from being connected in a misaligned orientation. As shown in FIGS. 11 and 12, the output outlet includes a common positive electrical connector 54 and two negative electrical connectors 56 separated by the common positive electrical connector 54. The common positive electrical connector 54 may have a different cross-sectional shape than a shape of the two negative electrical connectors. In at least one embodiment, each of the two negative electrical connectors 56 may have a same cross-sectional shape. One of the negative electrical connectors 56 may be in communication with the battery charger subsystem 26 and another negative electrical connector 56 may be in communication with the engine jump start subsystem 30. When a cable 16 and corresponding output plug 12 is attached to the common positive electrical connector 54 and a first negative electrical connection 62, the cable is in communication with the battery charger subsystem 26. When a cable 16 and corresponding output plug 12 is attached to the common positive electrical connector 54 and a second negative electrical connection 64, the cable 16 is in communication with the engine jump start subsystem 30. The system 10 is configured to automatically determine in which position the output plug 12 is positioned and place the system 10 into the corresponding operating mode.

In the embodiments shown in FIGS. 9-12, the system 10 may include a single multipurpose cable 16 configured to be usable for engine jump start processes and for battery charger processes. The single multipurpose cable 16 may include an output plug 12 configured to be removably attached to the output outlet 14. The output plug 12 may be coupled to the output outlet 14 in different positions to activate the battery charger subsystem 26 or the engine jump start subsystem 30. This can be accomplished by coupling the output plug 12 to a common pin and a pin or other connector associated with the battery charger subsystem 26 or to a common pin and a pin or other connector associated with the engine jump start subsystem 30. The system 10 automatically determines in which operating mode to operate based on which pins or other connectors the output plug 12 is attached to in the output outlet 14. In at least one embodiment, the microcontroller 100 determines the operating mode by reading a battery voltage across one pair of the three pins 50, 52.

Figure 13:
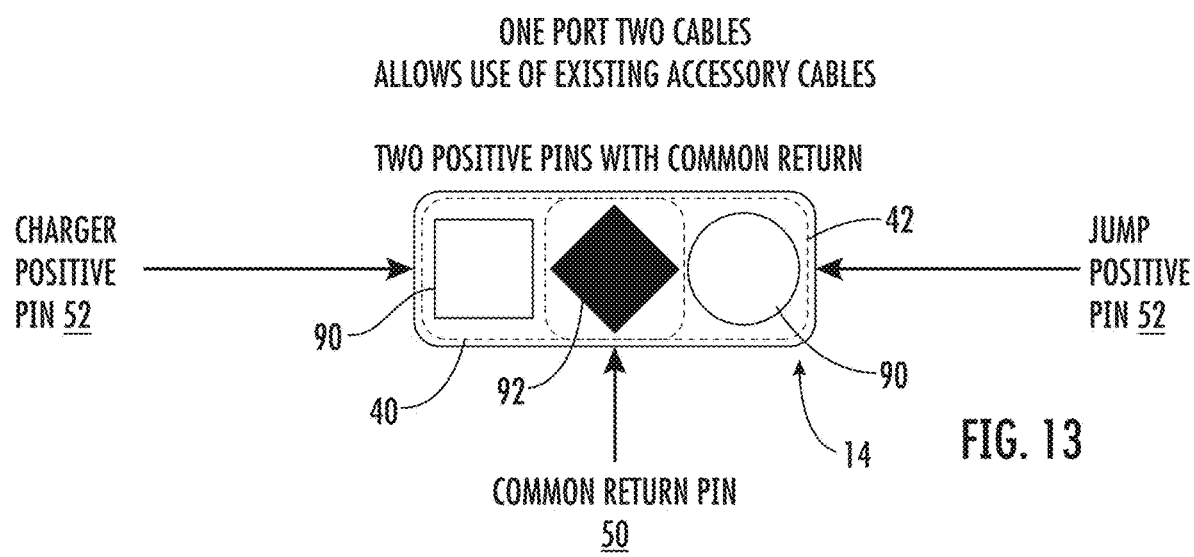
FIG. 13 is a front view of the output outlet for an embodiment with a single output outlet and two cables, in particular, a combined battery charger cable and an engine jump start cable, whereby the output outlet includes a two positive connectors separated by a single negative connector.
Figure 14:
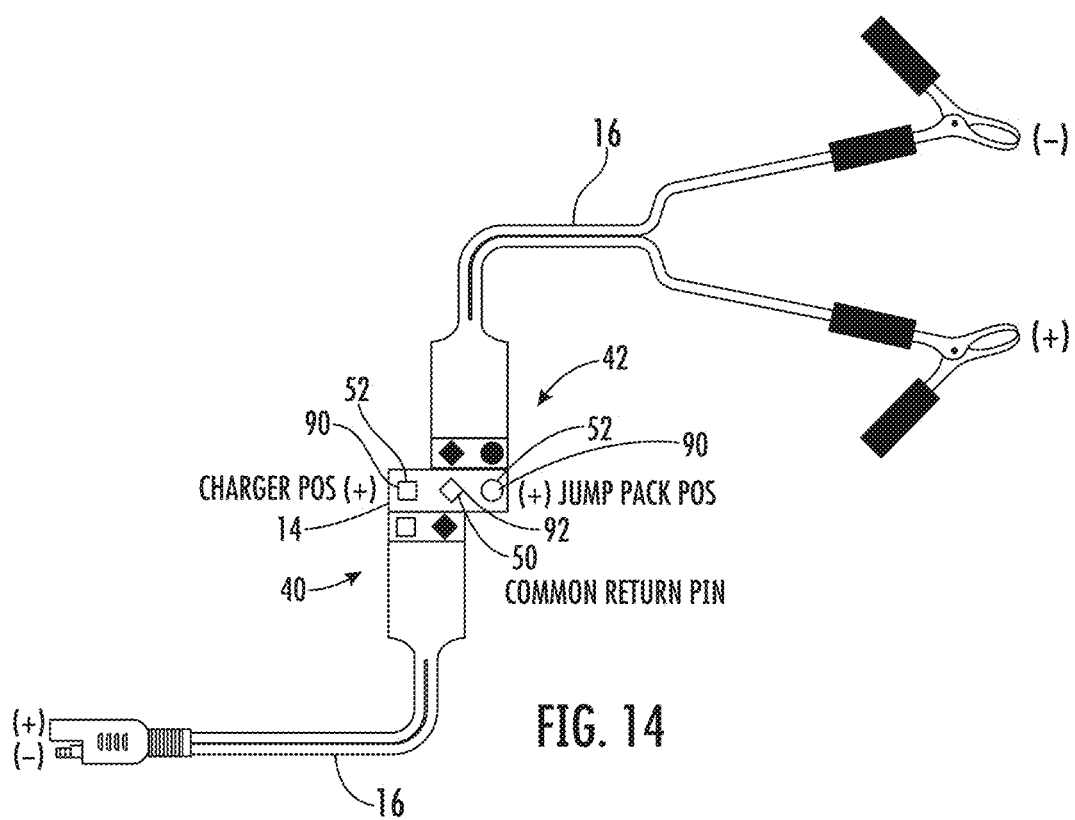
FIG. 14 is a diagram showing an output outlet and a cable positioned to be attached to the output outlet shown in FIG. 13.

In at least one embodiment, as shown in FIGS. 4-8 and 13-16, the output outlet 14 or the output plug 12 may be keyed to ensure proper connection of output plugs 12 to the output outlet 14. For example, as shown in FIG. 1, the output plug 12 may include first and second output plugs 20, 24. The first output plug 20 may be coupled to a charger cable 18. The first output plug 20 may be configured to be attached to the output outlet 14 in the first position 40 and not the second position 42. The second output plug 24 may be coupled to an engine jump start cable 22. Only one of the battery charger cable 18 and the engine jump start cable 22 may be attached to the output outlet 14 at a time. As shown in FIGS. 13-16, the second output plug may be configured to be attached to the output outlet 14 in the second position 42 and not the first position 40. In at least one embodiment, as shown in FIGS. 13 and 14, the output outlet 14 includes a common negative electrical connector 50 and two positive electrical connectors 52 separated by the common negative electrical connector 50. Each of the common negative electrical connector 50 and two positive electrical connectors 52 has a different cross-sectional shape.

Figure 15:
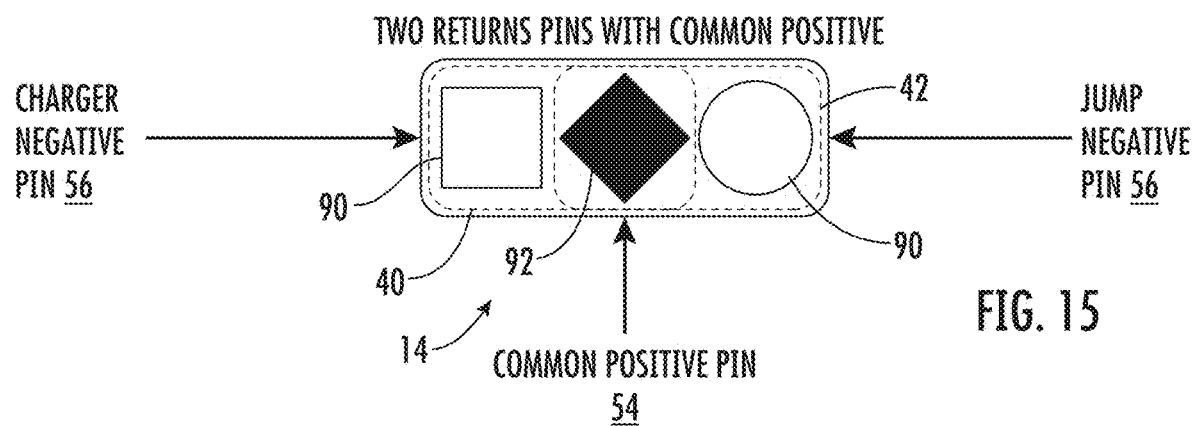
FIG. 15 is a front view of the output outlet for an embodiment with a single output outlet and two cables, in particular, a combined battery charger cable and an engine jump start cable, whereby the output outlet includes a two negative connectors separated by a single positive connector.
Figure 16:
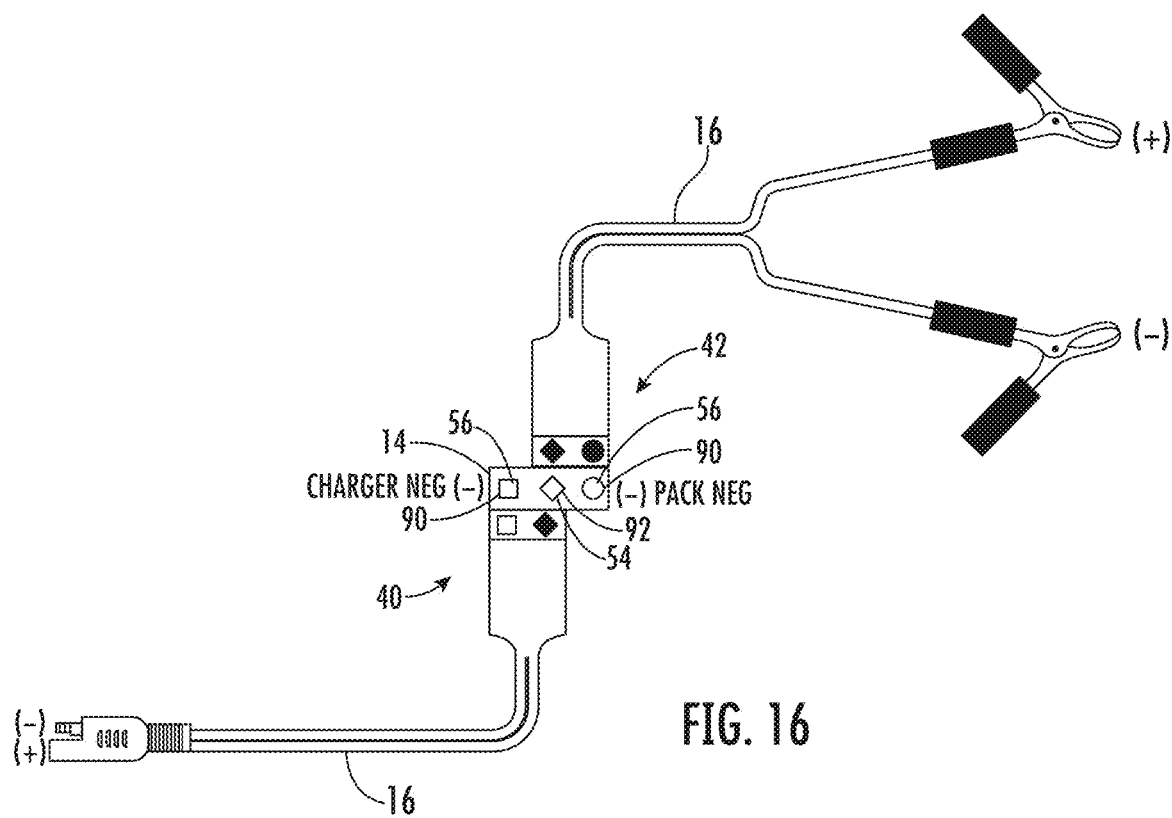
FIG. 16 is a diagram showing an output outlet and a cable positioned to be attached to the output outlet shown in FIG. 15.

In another embodiment, as shown in FIGS. 15 and 16, the output outlet 14 may include a common positive electrical connector 54 and two negative electrical connectors 56 separated by the common positive electrical connector 54. Each of the common positive electrical connector 54 and two negative electrical connectors 56 may have a different cross-sectional shape. In at least one embodiment, the microcontroller 100 determines the operating mode of the embodiment shown in FIGS. 13-16 by reading a battery voltage across one pair of the three pins 50, 52. The embodiment shown in FIGS. 13-16 enables currently existing charger accessory cables 36 to be used with the system.

Figure 4:
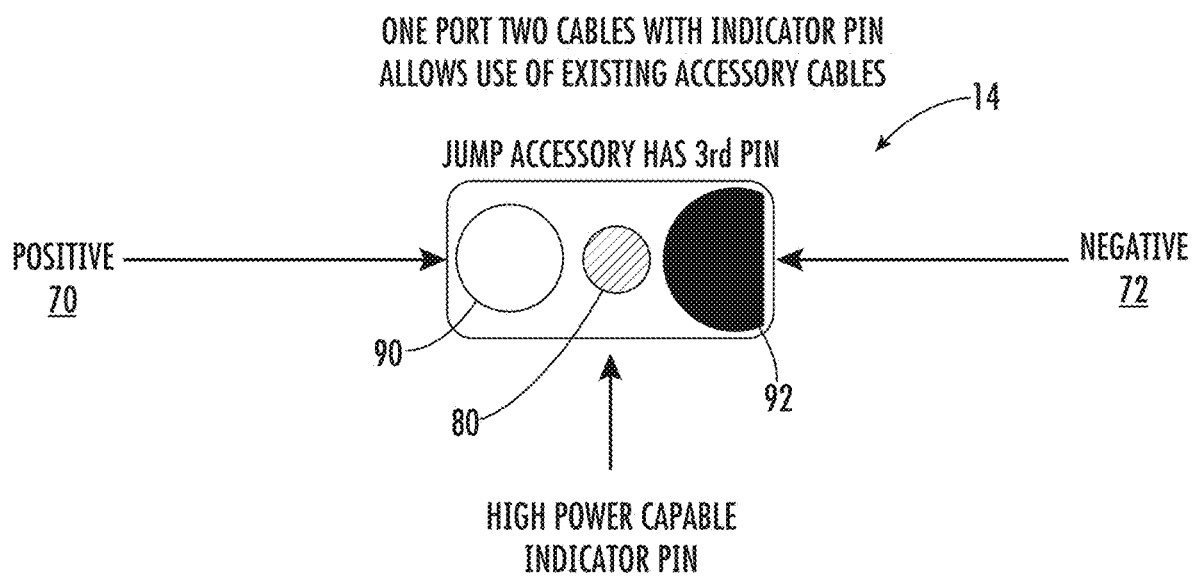
FIG. 4 is a front view of the output outlet with a function indicator for an embodiment with a single output outlet usable with a battery charger cable and an engine jump start cable.
Figure 5:
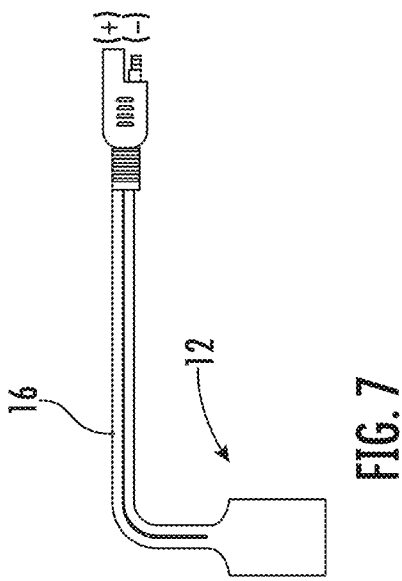
FIG. 5 is a top view of a cable usable as a battery charger cable and an engine jump start cable with an output plug configured to be attached to the output plug shown in FIG. 4.
Figure 7:
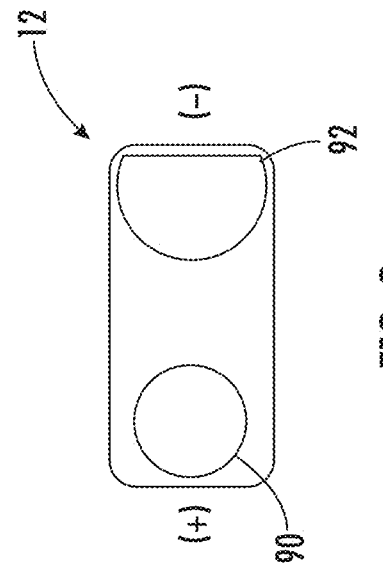
FIG. 7 is a top view of a cable usable as a charger accessory cable with an output plug configured to be attached to the output plug shown in FIG. 4.
Figure 6:
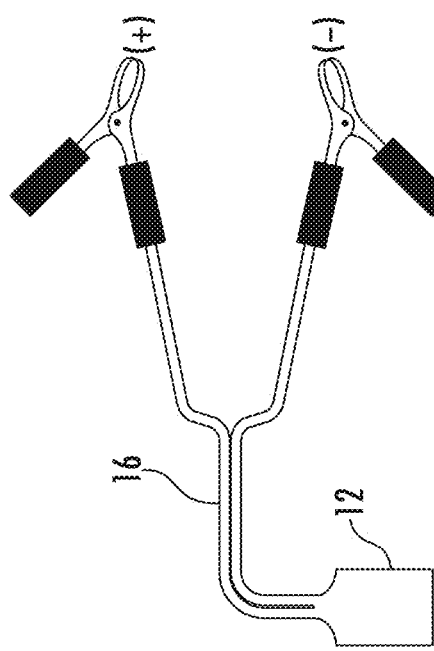
FIG. 6 is a front view of the output plug shown in FIG. 5.
Figure 8:
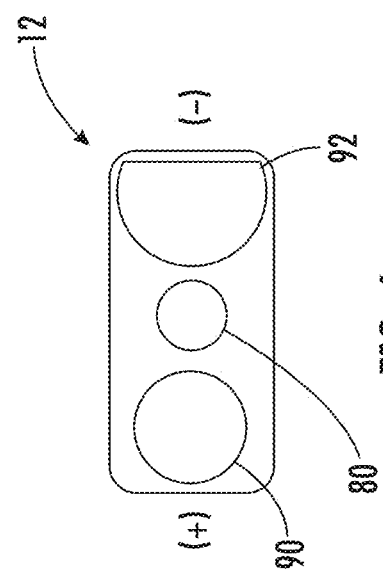
FIG. 8 is a front view of the output plug shown in FIG. 7.
Figure 9:
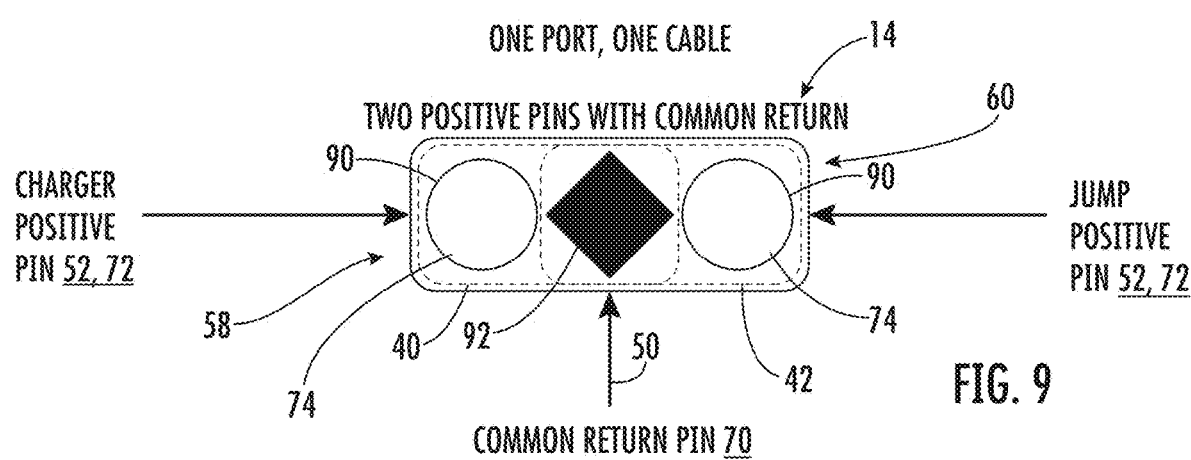
FIG. 9 is a front view of the output outlet for an embodiment with a single output outlet and a single combined battery charger cable and engine jump start cable, whereby the output outlet includes a two positive connectors separated by a single negative connector.

In at least one embodiment, as shown in FIGS. 4-6 and 15-18, the output outlet 14 may include a first connector 70 having a first electrical polarity and a second connector 72 having a second electrical polarity opposite to the first polarity. As shown in FIGS. 9-12, the second connector 72 may be formed from a second set of connectors 74 having a second electrical polarity opposite to the first polarity. As shown in FIGS. 4-8, the system 10 may include one or more function indicators 80 for identifying which cable 16, between a battery charger cable 18 and an engine jump start cable 22, is attached to the output outlet 14. In at least one embodiment, the output outlet 14 may include one or more function indicators 80 for identifying a type of cable 16. Alternatively, the output plug 12 may include a one or more function indicators 80 for identifying a type of cable 16. As such, the system 10 identifies which mode in which to operate based on the presence or absence of one or more function indicators 80. As shown in FIG. 4, if one or more function indicators 80 is present, then the system 10 understands that an engine jump start cable 22 is attached to the output outlet 14 and if a function indicator 80 is not detected, then the system 10 understands that an battery charger cable 18 is attached to the output outlet 14, or vice versa.

For the embodiment shown in FIGS. 4-8, the system 10 may include a keyed output outlet 14. The engine jump start cable 22 may include an output plug 24 with a function indicator to contact the function indicator 80 in the output outlet 14. The function indicator pin 80 may be tied either high or low in the cable 22. The microcontroller 100 may read the function indicator pin 80 to determine which type of cable 18 or 22 is inserted into the output outlet 14 and then configures switches 102, 116 and 118 for charging or an engine jump start attempt. The microcontroller 100 may read the absence of the function indicator pin 80 to determine which type of cable 18 or 22 is inserted into the output outlet 14 and then configures switches 102, 116 and 118 for charging or an engine jump start attempt. The microcontroller 100 may detect a battery 28 by reading voltage across positive and negative pins in the output outlet 14.

In at least one embodiment, as shown in FIGS. 4-8, the system 10 may include a positive electrical connector 90 and a negative electrical connector 92. The output outlet 14 may be keyed to prevent an output plug 12 from being connected in a misaligned orientation. The manner in which the output outlet 14, or the output plug 12, or both, may be keyed is not limited to any particular configuration. In at least one embodiment, the positive electrical connector 90 may have a cross-sectional shape that is different than a cross-sectional shape for the negative electrical connector 92.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A combined battery charger and engine jump start system, comprising:
   a battery charger subsystem configured to charge a battery;
   an engine jump start subsystem configured to output sufficient power to jump start an engine;
   an output outlet configured to releasably receive at least one output plug coupled to a cable;
   wherein the system automatically determines in which operating mode to operate based on the at least one output plug attached to the output outlet.

2. The combined battery charger and engine jump start system of claim 1, wherein the output outlet is configured to receive the at least one output plug in a first position within the output outlet such that the at least one output plug is in communication with the battery charger subsystem and is configured to receive the at least one output plug in a second position within the output outlet such that the at least one output plug is in communication with the engine jump start subsystem.

3. The combined battery charger and engine jump start system of claim 2, wherein the at least one output plug is coupled to a cable having positive and negative transmission lines that is usable for both operation of the battery charger subsystem and operation of the engine jump start subsystem.

4. The combined battery charger and engine jump start system of claim 1, wherein the output outlet is keyed to prevent a plug from being connected in a misaligned orientation.

5. The combined battery charger and engine jump start system of claim 4, wherein the output outlet includes a common negative electrical connector and two positive electrical connectors separated by the common negative electrical connector.

6. The combined battery charger and engine jump start system of claim 5, wherein the common negative electrical connector has a different cross-sectional shape than a shape of the two positive electrical connectors.

7. The combined battery charger and engine jump start system of claim 4, wherein the output outlet includes a common positive electrical connector and two negative electrical connectors separated by the common positive electrical connector.

8. The combined battery charger and engine jump start system of claim 7, wherein the common positive electrical connector has a different cross-sectional shape than a shape of the two negative electrical connectors.

9. The combined battery charger and engine jump start system of claim 2, wherein the output outlet is keyed to ensure proper connection of plugs to the output outlet.

10. The combined battery charger and engine jump start system of claim 2, wherein the at least one output plug comprises first and second output plugs, wherein the first output plug is coupled to a charger cable and the first output plug is configured to be attached to the output outlet in the first position and not the second position; and wherein the second output plug is coupled to an engine jump start cable and the second output plug is configured to be attached to the output outlet in the second position and not the first position.

11. The combined battery charger and engine jump start system of claim 10, wherein the output outlet includes a common negative electrical connector and two positive electrical connectors separated by the common negative electrical connector.

12. The combined battery charger and engine jump start system of claim 11, wherein each of the common negative electrical connector and two positive electrical connectors has a different cross-sectional shape.

13. The combined battery charger and engine jump start system of claim 10, wherein the output outlet includes a common positive electrical connector and two negative electrical connectors separated by the common positive electrical connector.

14. The combined battery charger and engine jump start system of claim 13, wherein each of the common positive electrical connector and two negative electrical connectors has a different cross-sectional shape.

15. The combined battery charger and engine jump start system of claim 2, wherein the output outlet includes a first connector having a first electrical polarity and a second connector having a second electrical polarity opposite to the first polarity.

16. The combined battery charger and engine jump start system of claim 15, wherein the second connector is formed from a second set of connectors having a second electrical polarity opposite to the first polarity.

17. The combined battery charger and engine jump start system of claim 1, wherein the output outlet includes at least one function indicator for identifying a type of cable.

18. The combined battery charger and engine jump start system of claim 1, further comprising a positive electrical connector and a negative electrical connector, wherein the output outlet is keyed to prevent a plug from being connected in a misaligned orientation.

19. The combined battery charger and engine jump start system of claim 18, further comprising a positive electrical connector and a negative electrical connector, whereby the positive electrical connector has a cross-sectional shape that is different than a cross-sectional shape for the negative electrical connector.

20. A combined battery charger and engine jump start system, comprising:
a battery charger subsystem configured to charge a battery;
an engine jump start subsystem configured to output sufficient power to jump start an engine;
an output outlet configured to releasably receive at least one output plug coupled to a cable;
a single multipurpose cable configured to be usable for engine jump start processes and for battery charger processes, wherein the single multipurpose cable includes the at least one output plug configured to be removably attached to the output outlet; and
wherein the system automatically determines in which operating mode to operate based on orientation of the at least one output plug attached to the output outlet.

21. A combined battery charger and engine jump start system, comprising:
a battery charger subsystem configured to charge a battery;
an engine jump start subsystem configured to output sufficient power to jump start an engine;
an output outlet configured to releasably receive at least one output plug coupled to a cable;
an engine jump start cable configured to be usable for an engine jump start process with a first output plug;
a battery charger cable configured to be usable for a battery charging process with a second output plug;
wherein the first output plug is configured to be attached to the output outlet in a first position;
wherein the second output plug is configured to be attached to the output outlet in a second position;
wherein the first and second positions are different positions; and
wherein the system automatically determines in which operating mode to operate based on whether the first outlet plug is attached to the output outlet in the first position or the second output plug is attached to the output outlet in the second position.

* * * * *